O. E. RISSER & P. E. McSWEENEY.
COMPRESSION LOCKING GREASE CUP.
APPLICATION FILED OCT. 18, 1910.

1,033,828.

Patented July 30, 1912.

WITNESSES
C. K. Davies

INVENTORS
P. E. McSweeney
O. E. Risser
By C. L. Parker
Attorney

UNITED STATES PATENT OFFICE.

OMER E. RISSER AND PETER E. McSWEENEY, OF SPRINGFIELD, MISSOURI.

COMPRESSION-LOCKING GREASE-CUP.

1,033,828.    Specification of Letters Patent.    Patented July 30, 1912.

Application filed October 18, 1910. Serial No. 587,731.

*To all whom it may concern:*

Be it known that we, OMER E. RISSER and PETER E. MCSWEENEY, citizens of the United States, residing at Springfield, in the county of Greene and State of Missouri, have invented certain new and useful Improvements in Compression - Locking Grease-Cups, of which the following is a specification.

This invention relates to lubricators of the type, which employs a casing for holding a suitable lubricant and a plunger mounted within this casing to move longitudinally of the same for forcing the lubricant out of said casing.

An important object of this invention is to provide a lubricator of the above character, which is characterized by simplicity of structure, and hence will be cheap to manufacture.

A further object of this invention is to provide means for locking the plunger against accidental displacement, yet permit of the rotation of the same by the employment of a proper tool.

The lubricator may be employed in connection with locomotives, automobiles, traction engines, and in fact, with any bearing which should be lubricated.

Other objects and advantages of this invention will be apparent during the course of the following description.

Figure 1:
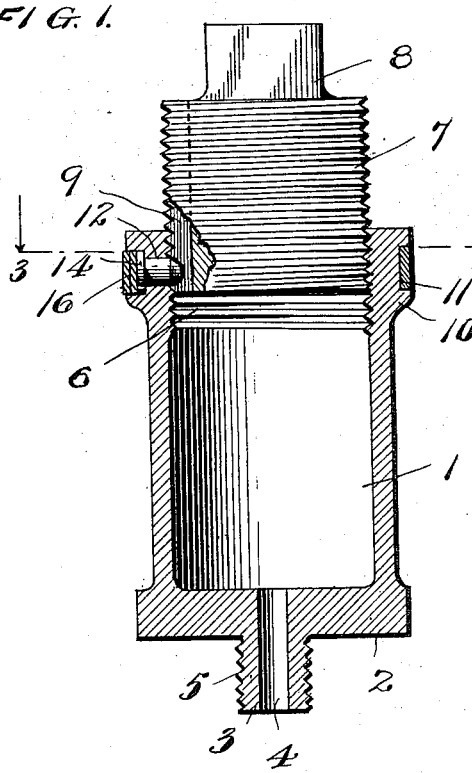
Figure 4:
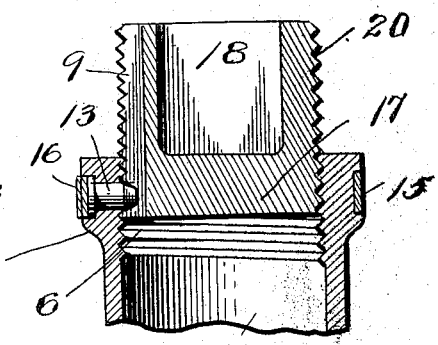
Figure 2:
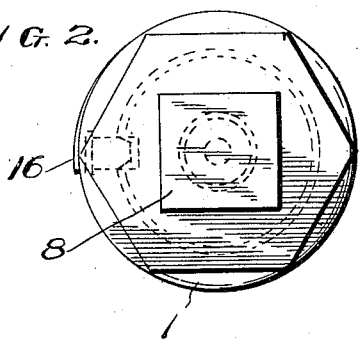
Figure 3:
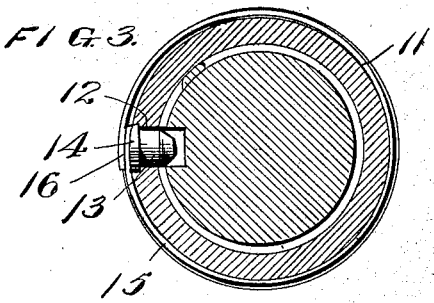

In the accompanying drawings forming a part of this specification, and in which like numerals are employed to designate like parts throughout the same, Figure 1 is a central vertical section through the lubricator, Fig. 2 is a plan view of the same, Fig. 3 is a horizontal section taken on line 3—3 of Fig. 1, and looking downwardly as shown by the arrow, and Fig. 4 is a view similar to Fig. 1, showing a modified form of plunger, with part of the lubricator broken away.

In the drawings wherein is illustrated a preferred embodiment of the invention, the numeral 1 designates a cylindrical casing having the lower end thereof provided with a head 2, as shown. This head has formed thereon at its center, a boss 3, which is provided with an axial opening 4 extending through the head 2 for communication with the interior of the casing 1. The boss 3 may preferably be externally screw threaded, as shown at 5, for engagement with suitable means (not shown) for connecting the lubricator with the bearing to be supplied with a lubricant. The bore of the casing 1 extends through the upper end thereof, as shown, and the upper portion of this casing is internally screw threaded as shown at 6, for a purpose to be explained.

As clearly illustrated in Fig. 1, a cylindrical externally screw threaded feed-plunger 7 is disposed within the upper screw threaded portion of the casing 1. This feed-plunger is provided upon its outer end with a reduced extension 8, which is preferably formed square in cross section for engagement with an ordinary wrench. From the construction of the above referred to parts, it is obvious that the feed-plunger may be readily removed from engagement with the casing 1, so that this casing may be filled with a lubricant, and then inserted within the screw threaded end of the casing and rotated to feed the lubricant from said casing.

The feed-plunger 7 is provided upon its periphery with a groove 9, which extends longitudinally of the feed-plunger, as shown. The upper open end of the casing 1 may preferably be provided with an annular flange 10, having an annular groove 11 formed upon the periphery of the same, as shown. The upper end of the casing 1 is further provided with a radially disposed opening 12, which leads into the annular groove 11. Movably mounted within the opening 12, is a locking pin 13, having the inner end thereof tapered, as shown. This tapered end is disposed within the groove 9. The locking pin 13 carries upon its outer end, a head 14, which is disposed within the annular groove 11. The annular groove 11 removably holds an annular spring 15, having overlapping ends 16, which engage the head of the locking pin 13 for yieldingly holding the inner end of the same within the groove 9.

From the construction of the above referred to parts, it is obvious that the locking pin 13 by virtue of its location within the groove 9, will hold the feed-plunger 7 against accidental rotation, and move outwardly against the pressure of the spring 15 to permit of the rotation of said feed-plunger, when a suitable tool, such as a wrench, is employed to rotate the same. When the feed-plunger 7 is rotated so that its groove 9 returns to a position for registration with the opening 12, the locking pin 13 will automatically return to its innermost position, whereby the inner end of the same is disposed within said groove and the accidental rotation of the feed-plunger 7 prevented, as above stated. Special attention is called to the fact that on account of the spring 15 being readily removable, the locking pin 13 may also be removed when the same becomes broken or worn.

The form of the invention as illustrated in Fig. 4, is exactly like the first form, except that a modified form of feed-plunger 17 is provided. This feed-plunger 17 has its upper portion provided with a recess 18, which is preferably square in cross-section, for receiving the prong of a suitable wrench. The feed-plunger 17 is externally screw threaded as shown at 20, and may be readily employed in place of the feed-plunger 7.

It is thought that the operation of the lubricator, in view of the above description and explanation, is obvious and therefore need not be recited.

It is to be understood that the form of the invention herewith shown and described is to be taken as a preferred example of the same, and that certain changes in the size, shape and arrangement of parts may be resorted to without departing from the spirit of the invention or the scope of the subjoined claim.

Having thus fully described the invention what we claim as new and desire to secure by Letters Patent, is—

A grease cup comprising, in combination, a casing open at one end and internally screw-threaded, an externally screw-threaded plug to operate in the casing and provided within a longitudinally extending groove, said casing being provided at its open end with an annular groove having a radially extending opening which leads into the axial opening of said casing, a separate pin disposed within the radially extending opening and having its inner end tapered to enter the longitudinal groove of said plug, to hold the same against accidental rotation and to allow said plug to be turned in both directions when desired, and an annular split spring disposed within the annular groove and having its free ends overlapping and placed in engagement with said separate pin.

In testimony whereof we affix our signatures in presence of two witnesses.

OMER E. RISSER.
PETER E. McSWEENEY.

Witnesses:
R. M. MURPHY,
J. W. OWENS.

Copies of this patent may be obtained for five cents each, by addressing the "Commissioner of Patents. Washington, D. C."